United States Patent

Tsuyama et al.

[11] Patent Number: 5,245,554
[45] Date of Patent: Sep. 14, 1993

[54] INTEGRATED QUALITY CONTROL METHOD AND SYSTEM

[75] Inventors: Tsutomu Tsuyama; Toshimasa Harada; Sadao Shimoyashiro, all of Kanagawa; Koichi Higano, Tochigi; Toshio Namiki, Tochigi; Chikaaki Yamaguchi, Tochigi; Kozo Izui, Tochigi, all of Japan

[73] Assignee: Hitachi, Ltd., Tokyo, Japan

[21] Appl. No.: 672,112

[22] Filed: Mar. 19, 1991

[30] Foreign Application Priority Data

Mar. 19, 1990 [JP] Japan ................................. 2-67006

[51] Int. Cl.$^5$ ..................... G06F 15/21; G06F 15/46
[52] U.S. Cl. ..................... 364/552; 364/186; 364/401; 364/551.01; 364/554
[58] Field of Search ............... 364/552, 550, 551.01, 364/554, 400, 401, 402, 148, 191, 474.04, 138, 167, 186

[56] References Cited

U.S. PATENT DOCUMENTS

| | | | |
|---|---|---|---|
| 4,644,480 | 2/1987 | Haruna et al. | 364/552 |
| 4,967,381 | 10/1990 | Lane et al. | 364/551.01 |
| 5,134,574 | 7/1992 | Beaverstock et al. | 364/552 X |

Primary Examiner—Kevin J. Teska
Attorney, Agent, or Firm—Antonelli, Terry, Stout & Kraus

[57] ABSTRACT

An integrated quality control method and system for explaining failure causes of a product. Information relating to failure of the product and measures taken to correct the failure as well as information relation to manufacture and distribution of the product are collected and inputted for storage in a data base. The information relating to the failure and measures taken to correct the failure is combined with the information relating to the manufacture and distribution of the product and the combined information is analyzed for enabling an estimate of causes of the failure of the product and a trend of possible failures.

14 Claims, 21 Drawing Sheets

FIG. 2

| # | Field | Size |
|---|---|---|
| 1 | PRODUCT CLASSIFICATION | X(4) |
| 2 | CHARGE CLASSIFICATION | X(1) |
| 3 | PART NUMBER | X(14) |
| 4 | TYPE OF PRODUCT | X(12) |
| 5 | SERIAL NUMBER | X(12) |
| 6 | ENTRY DATE | X(6) |
| 7 | JOINT NUMBER | X(6) |
| 8 | CARD NUMBER | X(6) |
| 9 | PART IDENTIFICATION | X(1) |
| 10 | AGENT CLASSIFICATION | X(1) |
| 11 | FAILURE MODE | X(4) |
| 12 | FREQUENCY | X(1) |
| 13 | PERIOD OF RUN | X(3) |
| 14 | MANUFACTURING YEAR | X(2) |
| 15 | FISCAL YEAR OF MANUFACTURE | X(2) |
| 16 | MANUFACTURING DATE | X(4) |
| 17 | LOT NUMBER | X(6) |
| 18 | BUSINESS OFFICE CODE | X(2) |
| 19 | SPECIAL AGENT CODE | X(6) |
| 20 | CIRCUIT NUMBER | X(6) |
| 21 | REPAIR DATE | X(6) |
| 22 | DATE OF PURCHASE OF THE PRODUCT | X(6) |
| 23 | CODE OR IDENTIFYING FAILURE FOR HIGH CENTRAL LEVEL | X(6) |
| 24 | ACTIONS TAKEN TO REPAIR THE FAILED PRODUCT, IDENTIFIED BY THE FAILURE CODE | X(1) |
| 25 | ACTION CODE | X(3) |
| 26 | CHARGE CLASSIFICATION FOR AN OFFICIAL TRIP | X(1) |
| 27 | ACTION CLASSIFICATION | X(1) |
| 28 | REASONS FOR FREE REPAIR | X(2) |
| 29 | REPAIR WORK CLASSIFICATION | X(1) |
| 30 | PERIOD CLASSIFICATION OF RUN | X(1) |
| 31 | REPAIR COST | |
| 32 | LABOR COST | 9(8) |
| 33 | PART COST | 9(8) |
| 34 | TOTAL COST | 9(8) |
| 35 | ACCEPTANCE NUMBER | X(6) |
| 36 | GUARANTEE (EFFECTIVE GUARANTEE PERIOD, EXPIRED GUARANTEE PERIOD) | X(1) |
| 37 | REQUESTER CLASSIFICATION | X(1) |
| 38 | REPAIRER CLASSIFICATION | X(1) |
| 39 | ADJUSTMENT, READJUSTMENT CODE (1) | X(1) |
| 40 | PART REPLACEMENT | |
| 41 | ADJUSTMENT, READJUSTMENT CODE (2) | X(1) |
| 42 | PART NUMBER (2) | X(14) |
| 43 | ADJUSTMENT, READJUSTMENT CODE (3) | X(1) |
| 44 | PART NUMBER (3) | X(14) |
| 45 | THE LAST FAILURE | |
| 46 | REPAIR DATE OF LAST FAILURE | X(4) |
| 47 | FAILURE MODE | X(4) |
| 48 | THE LAST FAILURE BUT ONE | |
| 49 | REPAIR DATE OF LAST FAILURE BUT ONE | X(4) |
| 50 | FAILURE MODE | X(4) |
| 51 | MODIFICATION NUMBER | X(6) |
| 52 | FAILURE IDENTIFICATION NUMBER CLASSIFIED BY A SUBSIDIARY COMPANY | |
| 53 | FAILURE PART | X(3) |
| 54 | FAILURE MODE | X(4) |
| 55 | PART NAME | X(20) |
| 56 | PART MAKER | X(6) |
| 57 | COMPANY CLASSIFICATION | X(1) |
| 58 | FAILURE EVENT CODE | X(4) |

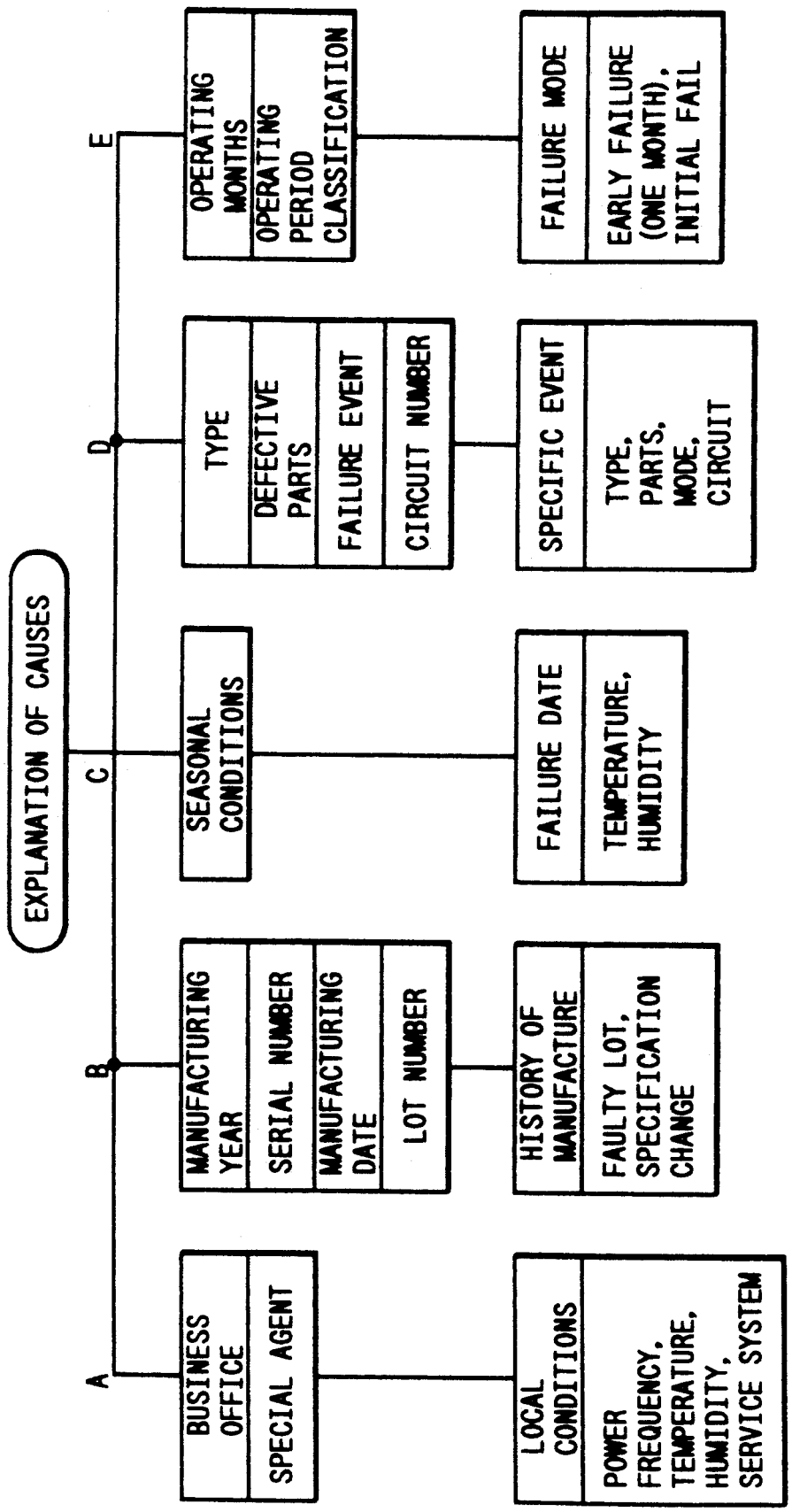

FIG. 7(a)

| ITEMS | DEFINITION |
|---|---|
| NUMBER OF FAILURES | THE NUMBER OF FAILURES IN THE CURRENT MONTH |
| CUMULATIVE TOTAL OF FAILURES | TOTAL NUMBER OF FAILURES UP TO THE CURRENT MONTH |
| REPAIR COST | TOTAL REPAIR COST IN THE CURRENT PERIOD (STATISTICAL MONTH) |
| CUMULATIVE REPAIR COST | TOTAL REPAIR COST UP TO THE CURRENT MONTH |
| MONTHLY FAILURE RATE | (THE NUMBER OF FAILURES IN THE CURRENT PERIOD)/(TOTAL NUMBER OF PRODUCTS DELIVERED UP TO THE CURRENT MONTH) |
| CUMULATIVE FAILURE RATE | (TOTAL NUMBER OF FAILURES UP TO THE CURRENT MONTH)/(TOTAL NUMBER OF PRODUCTS DELIVERED UP TO THE CURRENT MONTH) |
| MEAN FAILURE RATE | (TOTAL NUMBER OF FAILURES UP TO THE CURRENT MONTH)/(TOTAL OPERATING TIME UP TO THE CURRENT MONTH) |

FIG. 7(b)

| CLASSIFICATION | | ITEMS | DATA TYPE |
|---|---|---|---|
| CATEGORICAL DATA | IDENTIFI-CATION | RETRIEVAL IDENTIFICATION CODE, PRODUCT CLASSIFICATION, CHARGE CLASSIFICATION, DATA CLASSIFICATION, REPAIR CODE, (?), JOINT NUMBER, DEFECT NUMBER | 0 |
| | CAUSES | PART NUMBER, TYPE OF PRODUCT, EVENT CODE, (?), BUSINESS OFFICE CODE, SPECIAL AGENT CODE, CIRCUIT NUMBER, (?), ACTION CLASSIFICATION, REASONS FOR FREE REPAIR, REPAIR WORK CLASSIFICATION, OPERATING PERIOD CLASSIFICATION, PERIOD CLASSIFICATION, REQUESTER, REPAIRER, ADJUSTMENT/READJUSTMENT CODES (1), (2), (3), PART NUMBER (2), (3), THE LAST EVENT, THE LAST EVENT BUT ONE, IMPROVED LOT NUMBER, MAKER CODE, COOL/HOT CODE, PART DESIGNATION | I |
| | MANAGEMENT NUMBER | SERIAL NUMBER, LOT NUMBER, ACCEPTANCE NUMBER | II |
| SEQUENCE DATA | DATE | MANUFACTURING YEAR, (FISCAL YEAR OF MANUFACTURE) | III |
| | | STATISTICAL YEAR, MANUFACTURING DATA, FAILURE DATE, PURCHASE DATE, THE LAST REPAIR DATE, THE LAST REPAIR DATE BUT ONE | IV |
| QUANTITATIVE DATA | | OPERATING MONTHS, REPAIR COST | V |

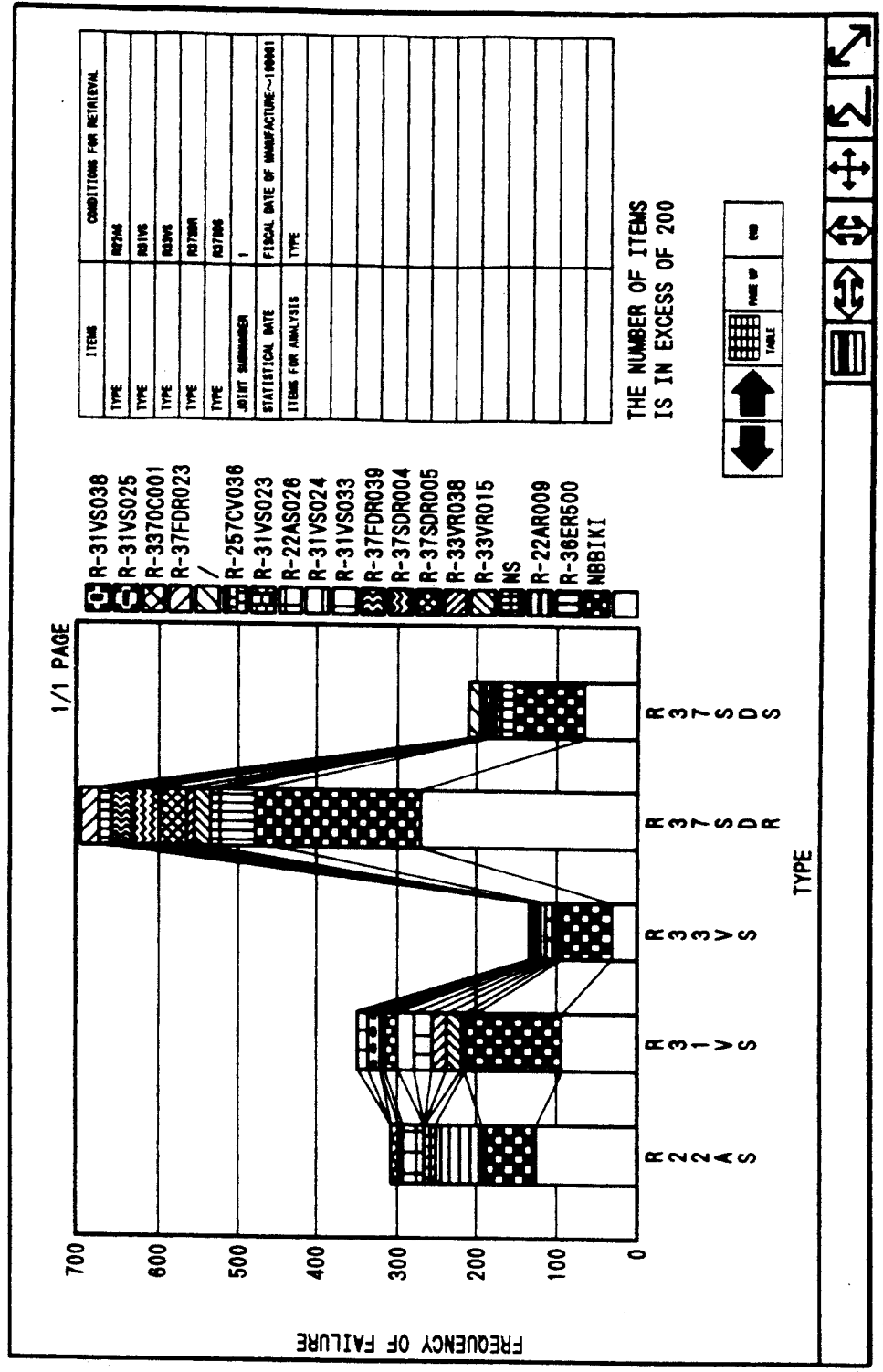

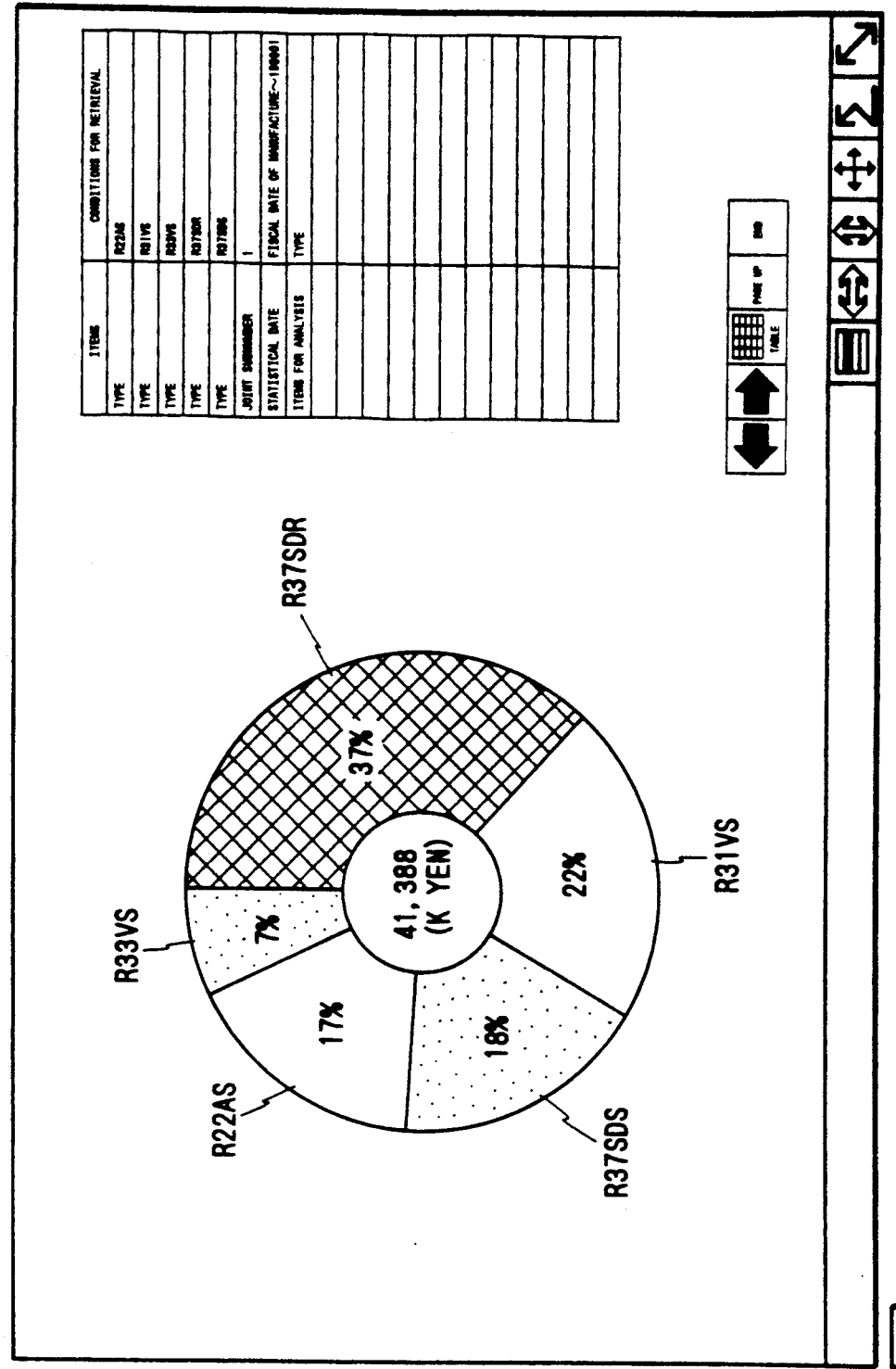

FREQUENCY OF FAILURE FOR OPERATING MONTHS

FIG. 8(g)

| TOTAL NUMBER OF CASES | 3140 | | | |
|---|---|---|---|---|
| NO | TYPE | SERIAL NUMBER | PART NUMBER1 | EVENT CODE |
| 1 | R22AS | 00520449 | Y000 | NOISE (INTERFERENCE) |
| 2 | R33VS | 00099612 | Y | OTHERS |
| 3 | R31VS | 00999900 | Y | RANDOM EVENT |
| 4 | R31VS | 00090226 | Y | OTHERS |
| 5 | R31VS | 00074868 | Y | FRACTURE, BREAKAGE, FISSURES |
| 6 | R22AS | 00149423 | Y | OTHERS |
| 7 | R22AS | 00106589 | Y | DEFORMATION, DISTORTION |
| 8 | R22AS | 00106605 | Y | OTHERS |
| 9 | R22AS | 00144725 | Y | SCRATCHES |
| 10 | R22AS | 00144801 | Y | SCRATCHES |
| 11 | R22AS | 00148400 | Y | DEFORMATION, DISTORTION |
| 12 | R22AS | 00149123 | Y | SCRATCHES |
| 13 | R22AS | 00150212 | Y | SCRATCHES |
| 14 | R22AS | 00222120 | Y | 1037 |
| 15 | R31VS | 00011617 | Y | DEFORMATION, DISTORTION |

SERVICE CARD

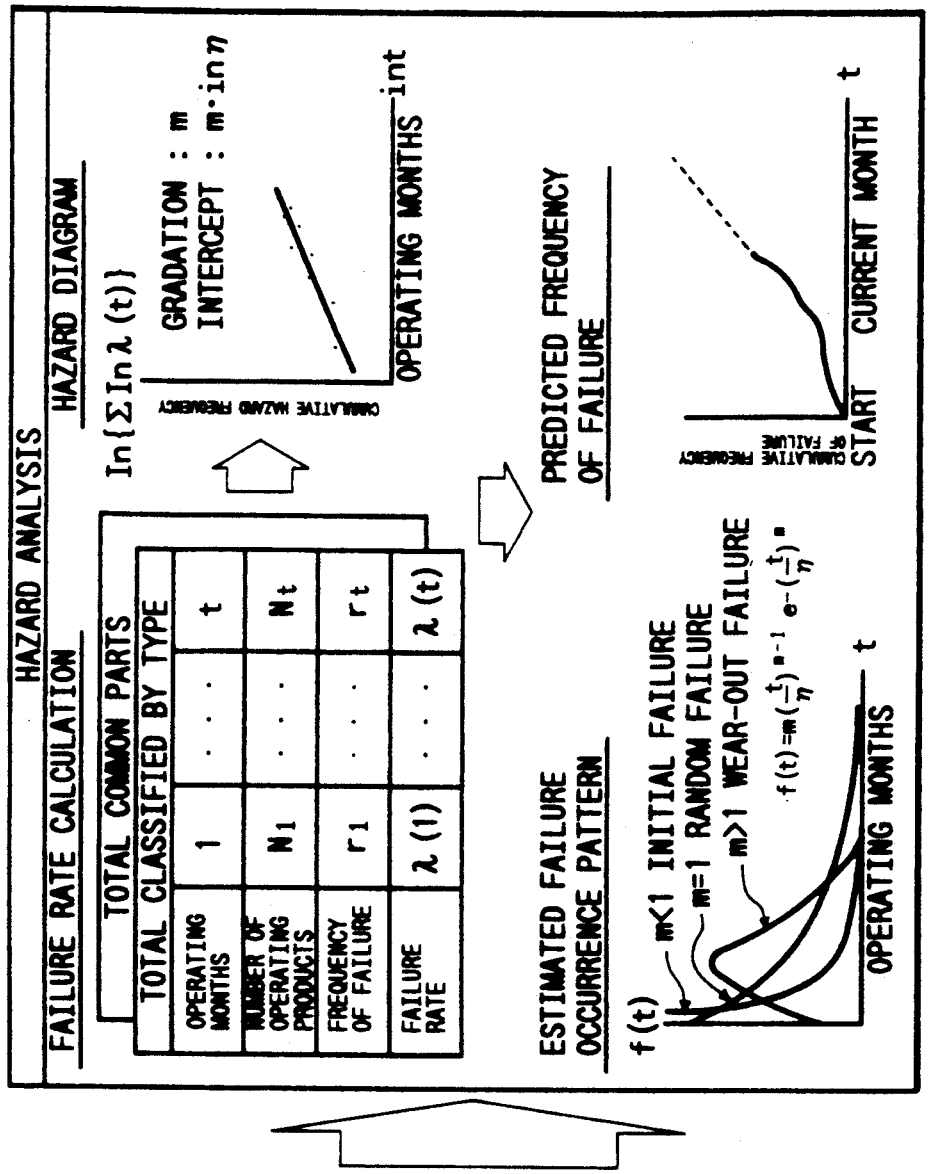
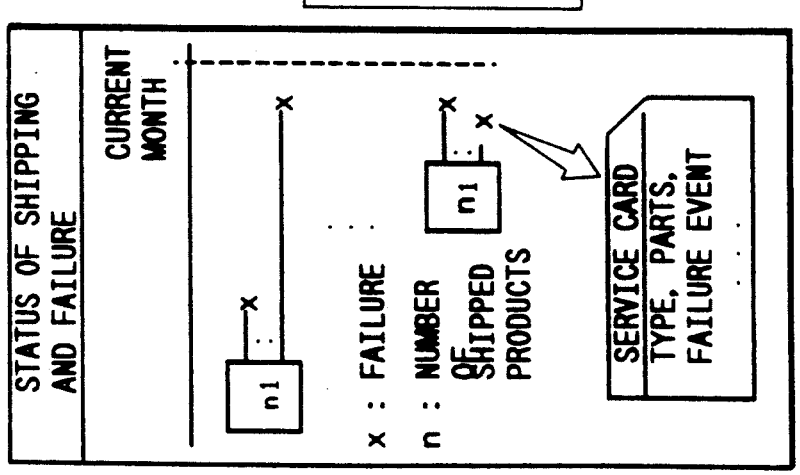
FIG. 13

INTEGRATED QUALITY CONTROL METHOD AND SYSTEM

BACKGROUND OF THE INVENTION

The present invention relates to a method and system for collecting information concerning the quality of products from customers as well as during the manufacture and sale of the product, and retrieving and analyzing the accumulated information.

A failure information input method employing barcodes is disclosed in Japanese Patent Application Laid-open (Kokai) No. 63-40962, in which nothing is stated clearly about methods of accumulation, management, retrieval and analysis of data, and information concerning failure is referred to simply as "details of failure", which is obscure.

A quality information system is disclosed in "Quality Information System Linking Production Process and the Market", Toshiba Corp., Fukaya Works, ENGINEERS, August, 1987. This quality information system manages quality data acquired in the market by a main frame computer installed in the factory and applies a statistical method to the analysis of the quality data.

The foregoing prior art systems or methods have the following drawbacks. First, no consideration is given to items of data to be collected and the manner of collecting data, and hence problems arise in the practical application of the system to quality control. Secondly, no consideration is given to the method of accumulating and managing quality data and the method of retrieving data, and hence the system has problems in its cost performance and its feasibility including expandability. Third, the system has only functions for displaying the condition of the failure of a product having actually occurred in the field and problems in the quality of products, and is unable to function as a tool for locating the causes of failure and problems. Furthermore, no detailed consideration is given to setting conditions for operating the main frame computer to retrieve and analyze the information, and hence the dynamic or flexible operation of the edit function and analyzing function of the main frame computer cannot be expected.

SUMMARY OF THE INVENTION

It is an object of the present invention to realize a method and system capable of permitting the operator of the system to set detailed conditions for data retrieval and analysis on the basis of data of the actual failure of a product which occurred in the field and problems with the quality of the product, and to achieve the analysis of causes of the failure and problems in a short time.

In accordance with the present invention, there is provided an integrated quality control method and system which enables a field serviceman assigned to the maintenance of a customer's equipment to report information concerning repair work performed on the site of installation of a product, to repair the failed product immediately in an on-line mode through an office of the business department, such as a special agent or a business office, to the factory, which is the principal department responsible for the design, manufacture and inspection of the product, by means of a computer network.

The computer network in accordance with a feature of the present invention is a hierarchical system of general purpose main frame computers, of general-purpose main frame computers and work stations, or of work stations.

The field serviceman according to a feature of the present invention records the type of the product, the condition of failure, parts used and details of repair work in a card of a predetermined format each time repair work is performed on the site, and then the field serviceman enters the contents of the card through a terminal of the general-purpose computer, installed in the office of the business department.

According to the present invention, in case a product installed at the customer's site of installation failed and the field serviceman performed repair work to repair the failed product, information concerning the repair work is immediately reported through an office of the business department, such as an office of a special agent or a business office, to the factory, i.e., the principal department responsible to the design, manufacture and inspection of the product. Accordingly, the improvement in design of products in production, evaluation of component parts and the improvement of the inspection system can be achieved quickly and improvements can be incorporated into the design of a new product to provide the new product with high reliability.

Since all the operations necessary for the retrieval and analysis of quality data can be achieved at a work station, a sequence of retrieval, request for analysis, data processing and data output can be executed by a real-time operation to curtail the turnaround time of analysis work.

Furthermore, the analysis of each item of data relating to the repair of the failed product and that of combinations of the items of the data can be achieved by retrieving and developing records of source data on a memory at a work station.

Additionally, in accordance with the present invention, environmental factors such as temperature, humidity and the like at the time of manufacture of the product and at failure thereof are correlated for analysis purposes.

These and further objects, features and advantages of the present invention will become more obvious from the following description when taken in connection with the accompanying drawings.

BRIEF DESCRIPTION OF THE DRAWINGS

FIG. 2 is an illustration of the format of a card for recording information for carrying out the present invention;

FIG. 3 is a block diagram showing the correlation of the failure and problems in the quality of a product that occur in the field and the causes of the failure and the problems;

FIGS. 7(a) and 7(b) are tables of management items and items of data, respectively, on which a numerical operation is executed in response to an analysis request in carrying out the present invention;

FIGS. 8(a) to 8(g) are views showing output formats in which the results of numerical operations are provided;

FIG. 13 is a view for explaining steps of a procedure for estimating possible failures from data of failures occurred and the shipping condition of the product.

DETAILED DESCRIPTION OF THE PREFERRED EMBODIMENTS

Figure 1:
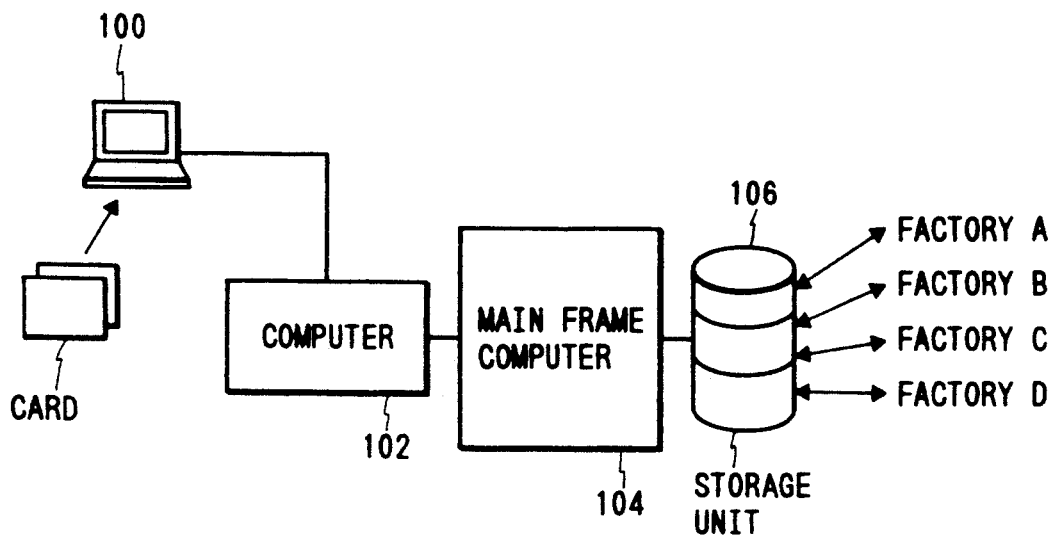
FIG. 1 is a block diagram of an integrated quality control system embodying the present invention.

FIG. 1 shows the general construction of an integrated quality control system embodying the present invention, namely, a network including a field service station where quality data acquired at the customer's site is entered for transmission to factories. In case a product fails at a customer's working site, a field serviceman assigned to the maintenance of the product performs repair work at the customer's working site and sends information principally concerning the details of the repair work performed at the site in an on-line mode through an office of the business department, such as an office of a special agent or a business office, to the factory, which is the principal department responsible for the design, manufacture and inspection of the product. More specifically, quality data acquired through the repair of products at customer's working sites and recorded on cards are entered by terminals 100 installed at an office of a special agent such as a sales office. The quality data are edited by means of computers 102 installed respectively at business offices and all of the edited quality data are sent to a single main frame computer 104 from the business offices. Then the main frame computer classifies the edited quality data by factory, rearranges the quality data and stores the rearranged quality data in a large-capacity storage unit 106 having a mail box function. The large-capacity storage unit is accessible to all computers installed in factories A, B, C and D, for example. Every time repair work is performed at the site by a field serviceman, the field serviceman records the details of the repair work including the type of the product, the condition of failure, parts used and measures taken in a card 108 of a predetermined format. The contents of the card are entered by the terminal of a general-purpose computer installed in the office of the business department. FIG. 2 shows the format of the card 108. Data of several tens items of information are recorded on the card. Twenty-seven principal items of information corresponding to item numbers of the card 108 as shown in FIG. 2 are as follows.

(1) Item 1 : Product classification ... Type, Designation (2) Item 2 : Charge classification ... Free, Charged (3) Item 28 : Reasons for free service (4) Item 5 : Serial number (Product identification number)

(5) Item 3 : Part number (The part numbers of repaired parts)

(6) Item 8: Card number (Card identification number)

(7) Item 7 : Joint number (Serial number assigned to a part)

(8) Item 35: Acceptance number (Card number managed by the special agent or the sales agent (9) Item 10: Agent classification (Business office, Special agent, Sales agent)

(10) Item 11: Condition (Condition of failure)

(11) Item 12: Frequency (Frequency or causes of failure)

(12) Item 13: Period of operation (Months elapsed from the start of operation)

(13) Item 19: Special agent (Special agent concerned)

(14) Item 18: Business office (office controlling the special agent)

(15) Item 37: Requester classification (Customer, Sales agents, Special agent)

(16) Item 38: Executor classification (Company, Subcontractor)

(17) Item 21: Date of repair

(18) Item 36: Guarantee (Effective guarantee period, Expired guarantee period)

(19) Item 22: Date of purchase of the product

(20) Item 26: Site classification (Shop repair, Field repair)

(21) Item 27: Repair work (Details of repair work)

(22) Item 39: Action (Adjustment, Readjustment)

(23) Item 29: Repair work classification (Replacement, Inspection)

(24) Item 31: Repair cost (Labor cost, Part cost)

(25) Item 26: Repair cost entry date (Month and year of entry)

(26) Item 55: Parts repaired

(27) Item 56: Part maker (Makers of repaired parts)

The manufacturing department adds the following eleven items of information corresponding to the item numbers of card 108 in FIG. 2.

(28) Item 24: Type of product (Type, Model)

(29) Item 14: Manufacturing date

(30) Item 15: Fiscal year of manufacture (Fiscal year in which the first product of the corresponding type was shipped)

(31) Item 17: Lot number

(32) Item 20: Circuit number (Part identification number)

(33) Item 23: Failure code (Code for identifying failure for high control level)

(34) Item 24: Action classification (Actions taken to repair the failed product, identified by the failure code)

(35) Item 25: Location of responsibility (Manufacturer, Customer)

(36) Item 27: Action code (Action identification code)

(37) Item 51: Modification number (The number of modification for improving defects in the lot)

(38) Item 30: Operation period classification (Period between manufacture and failure)

(39) Items 45 and 48: Repair history (History of the past repair work)

The listed information about the repair work and the product is analyzed in combination with the quantity of products sold. The quantity of products sold is the quantity of the products delivered from the business office to the special agent, the quantity of the products delivered from the special agent to the sales shop or the quantity of the products delivered from the sales shop to the customers, classified by type, month and business office.

FIG. 3 shows the relation between faults in products actually found in the field and problems in quality, and their causes. The chart shown in FIG. 3 exemplifies some of the relations between the contents of the card and related causes for five different examples.

Example A: Dependence of the distribution of failures classified by the special agent or the business office assigned to the repair work on local climate (temperature, humidity) and the service system.

Example B: Dependence of the distribution of failures classified by the year of manufacture, serial number, lot and date of manufacture on the history of manufacture including the use of defective parts and the modification of specifications.

Example C: Dependence of the distribution of failures classified by the date of repair on seasonal factors including temperature and humidity.

Example D: Dependence of the distribution of failures classified by the type of products and repaired parts (modules) and the condition of failures on the type and parts of products.

Example E: Dependence of the distribution of failures classified by the period of operation of products or its class on initial failure, accidental failure or failure due to wear.

Figure 4:
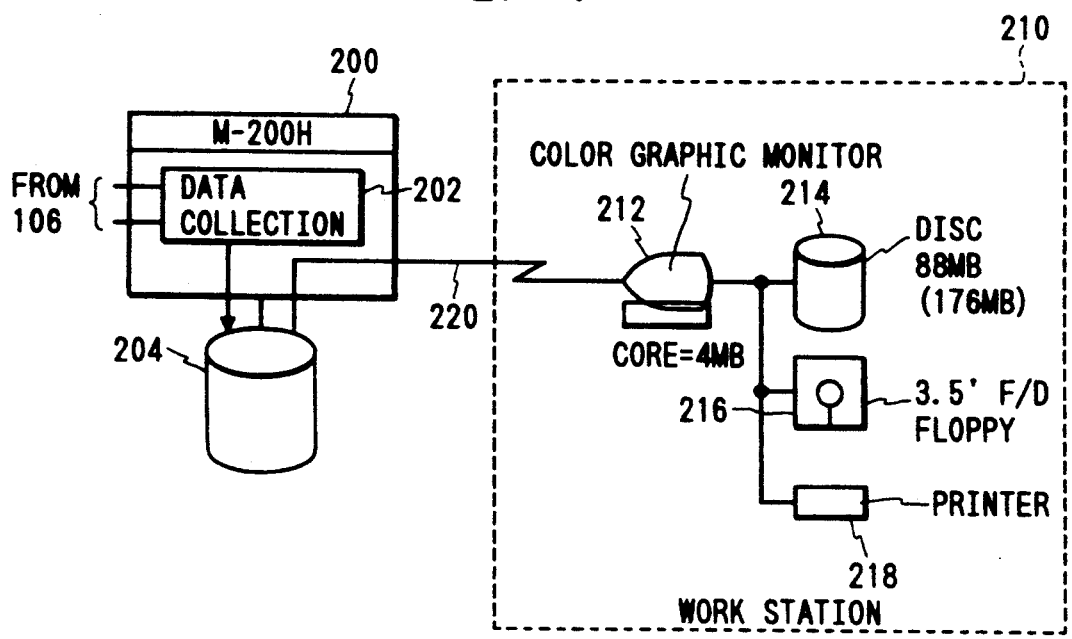
FIG. 4 is a block diagram of a computer installed in each factory for requesting a main frame computer to transfer quality data and for accumulating and managing the received quality data, and a work station for retrieving and analyzing the quality data.

FIG. 4 shows a block diagram arrangement of the computer 200 of each factory (Factory A-D, for example, of FIG. 1) for requesting the large-capacity storage unit 106 of FIG. 1 to send data and for accumulating and managing the received quality data for the factory via a data collection unit 202, and a work station 210 for retrieving and analyzing the quality data. A large-capacity storage unit 204 connected to the computer 200 stores the quality data and customer data of all the products of the factory. The work station 210 which includes a color graphic monitor 212 retrieves and analyzes the quality data, retrieves data from an external storage unit 214 storing a database including quality data, and feeds the results of analysis to an external storage unit such as a floppy disc 216 or a printer 218. The work station 210 is connected to the computer 200 by a high-speed network 220. When the work station 210 requires data other than those available from the database of the work station, the data is transferred by the computer 200 through the high-speed network to the work station.

Figure 5:
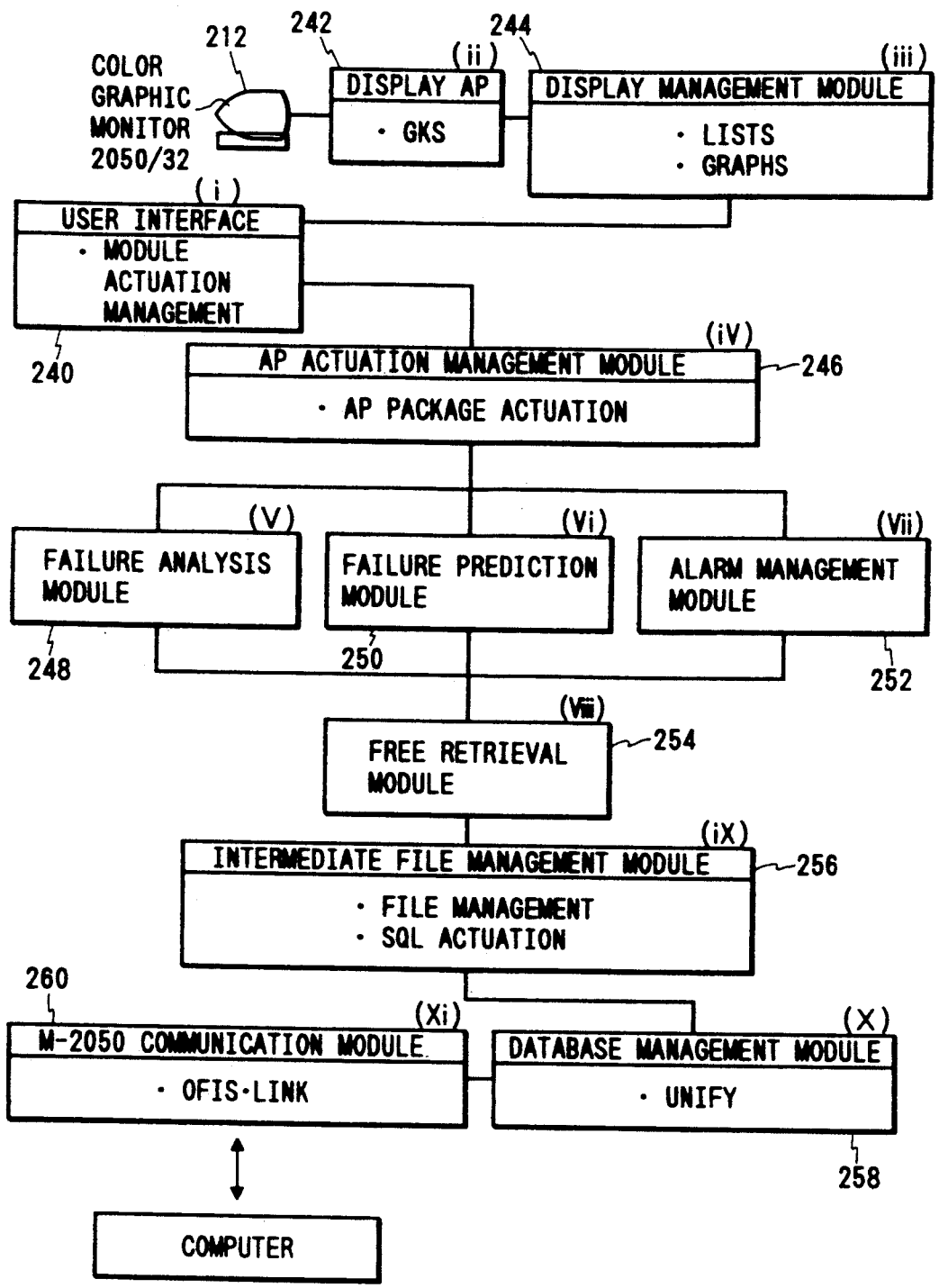
FIG. 5 is a flow chart for the retrieval and analysis of quality data at the work station shown in FIG. 4.

FIG. 5 is a flow chart for the retrieval and analysis of quality data by the work station of FIG. 4. Modules assigned to functions shown in FIG. 5 will be described hereinafter. (i) A user interface 240 controls the start and termination of the modules. (ii) A display application 242 controls the display operation of the color graphic monitor 212 using a graphic package. (iii) A drawing or display management module 244 controls the start and termination of the display application. (iv) An application start/management module 246 starts and terminates each module. (v) A fault or failure analyzing module 248 has analyzing functions for analyzing data for distribution, correlation and trend. (vi) A failure predicting module 250 predicts a failure occurrence distribution through hazard analysis. (vii) An alarm management module 252 manages the budget for dealing with failures and the progress of a plan for supplying parts. (viii) A free retrieval module 254 designates the retrieval of specified items from an intermediate file or a database. (ix) An intermediate file management module 256 manages the intermediate file and starts a database retrieval language. (x) A database management module 258 is a database manager for the management and updating of the database and the retrieval of data from the database. (xi) An M-2050 communication module 260 controls data communication between the computer and the work station.

Figure 6:
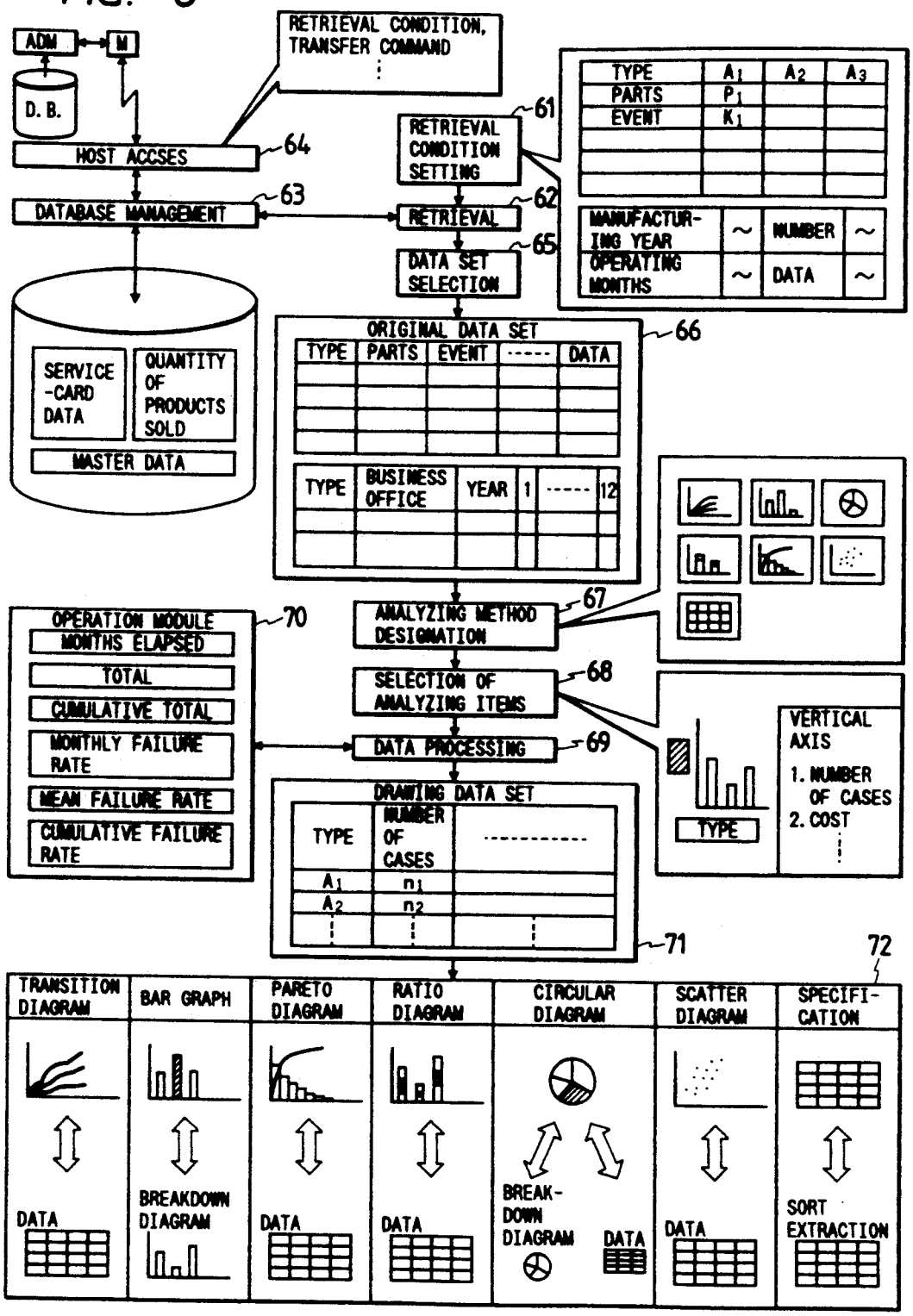
FIG. 6 is a flow chart of a procedure for the retrieval and analysis of quality data at the work station of an integrated quality control system embodying the present invention.

FIG. 6 shows a procedure for the retrieval and analysis of quality data to be executed by the work station. Steps of the procedure shown in FIG. 6 will be described in order of data retrieval and data analysis. Conditions for data retrieval are set in step 61. Data is retrieved and a database management function to be executed in step 63 is started in step 62 When the data set of the database does not meet the retrieval conditions, data unavailable from the database is transferred from the computer to the database by a host access function and the data is registered in the database in step 64. An original data set retrieved in step 62 is written in a core storage. Items of data set selected in step 65 for data set item selection can be used for direct reference. The data set written in the core storage is analyzed. An analyzing method is specified in step 67, parameters for analysis are selected in step 68, and then the data is processed in step 69. In step 69, a numerical operation is carried out according to the analyzing method specified in step 67, and then results of numerical operations are provided in an output format 72 specified by the analyzing method. The numerical operation conforming to the analyzing method calculates a management item shown in FIG. 7($a$) for each item of data shown in FIG. 7($b$).

Functions obtained through the numerical operation according to the analyzing method specified in step 67 and provided in the output format 72 according to the analyzing method will be described hereinafter.

(i) Transition Diagram

FIG. 8($a$) shows an example of a transition diagram. Data representing the frequency of failure, the repair cost and the failure rate are stratified into five strata at the maximum and the stratified data are plotted in a time series mode. The values of the data are tabulated.

(ii) Bar Graph

FIG. 8($b$) shows an example of a bar graph. Data representing the frequency of failure, the repair cost and the failure rate are stratified by category and the stratified data are displayed. Items of a specified category can be stratified and displayed in further categories. The values of the data are tabulated.

(iii) Pareto Diagram

FIG. 8($c$) shows an example of a Pareto diagram. The data representing the frequency of failure, the repair cost and the failure rate are stratified by category and are plotted in a Pareto diagram. The ratios of the values of items to the total value are shown in a cumulative distribution graph. The data are tabulated and displayed.

Figure 8A:
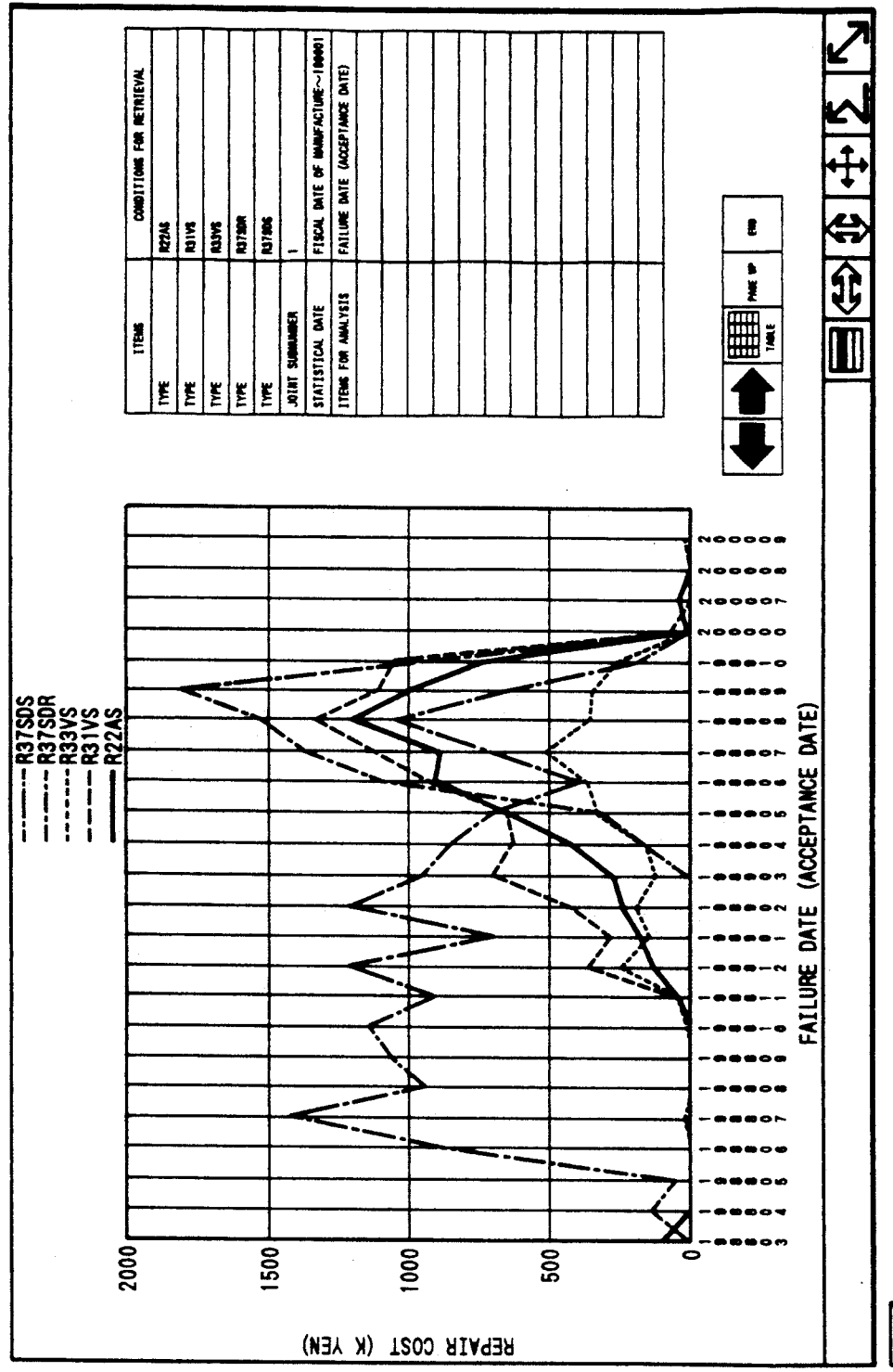
Figure 8B:
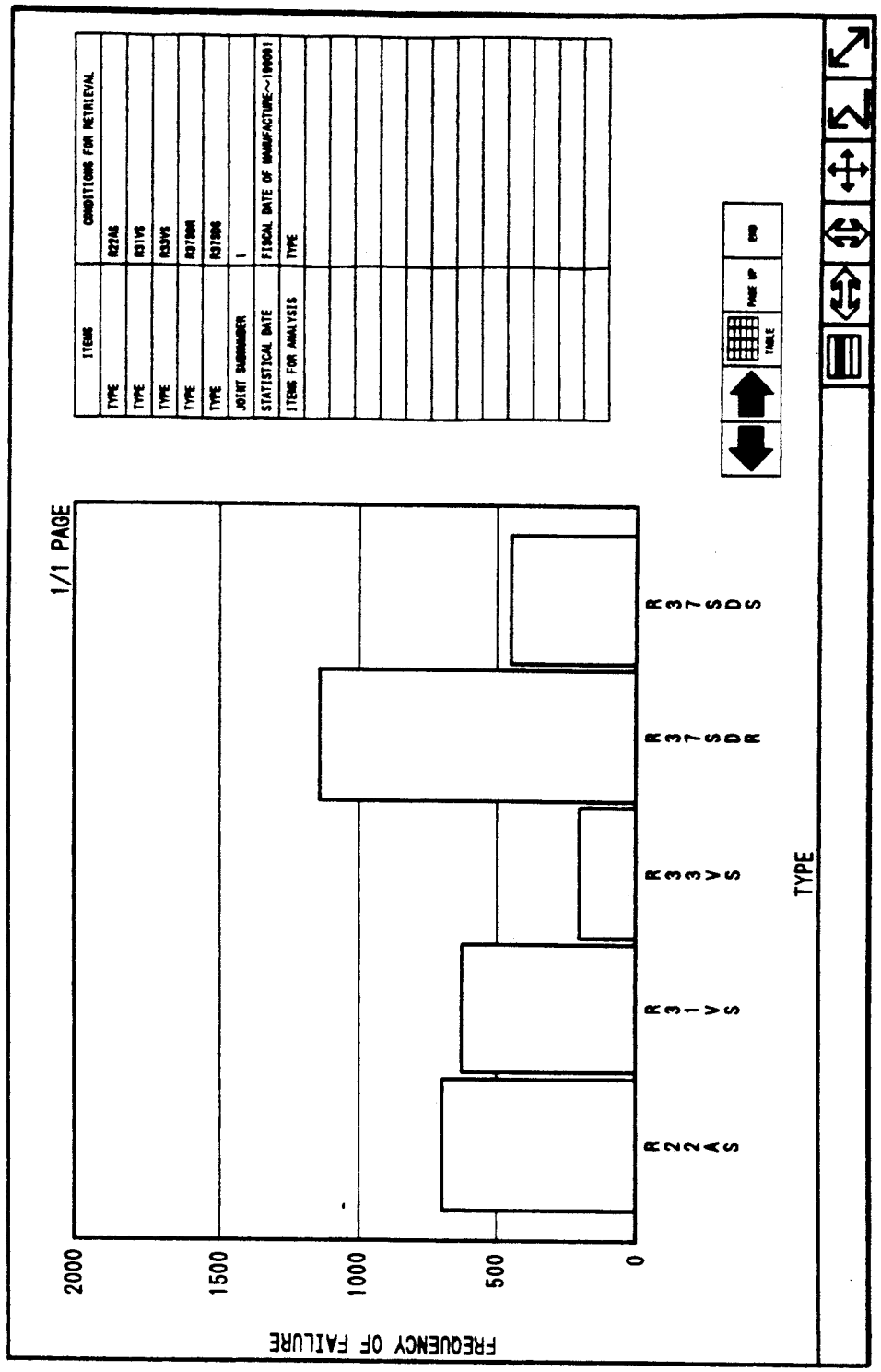
Figure 8C:
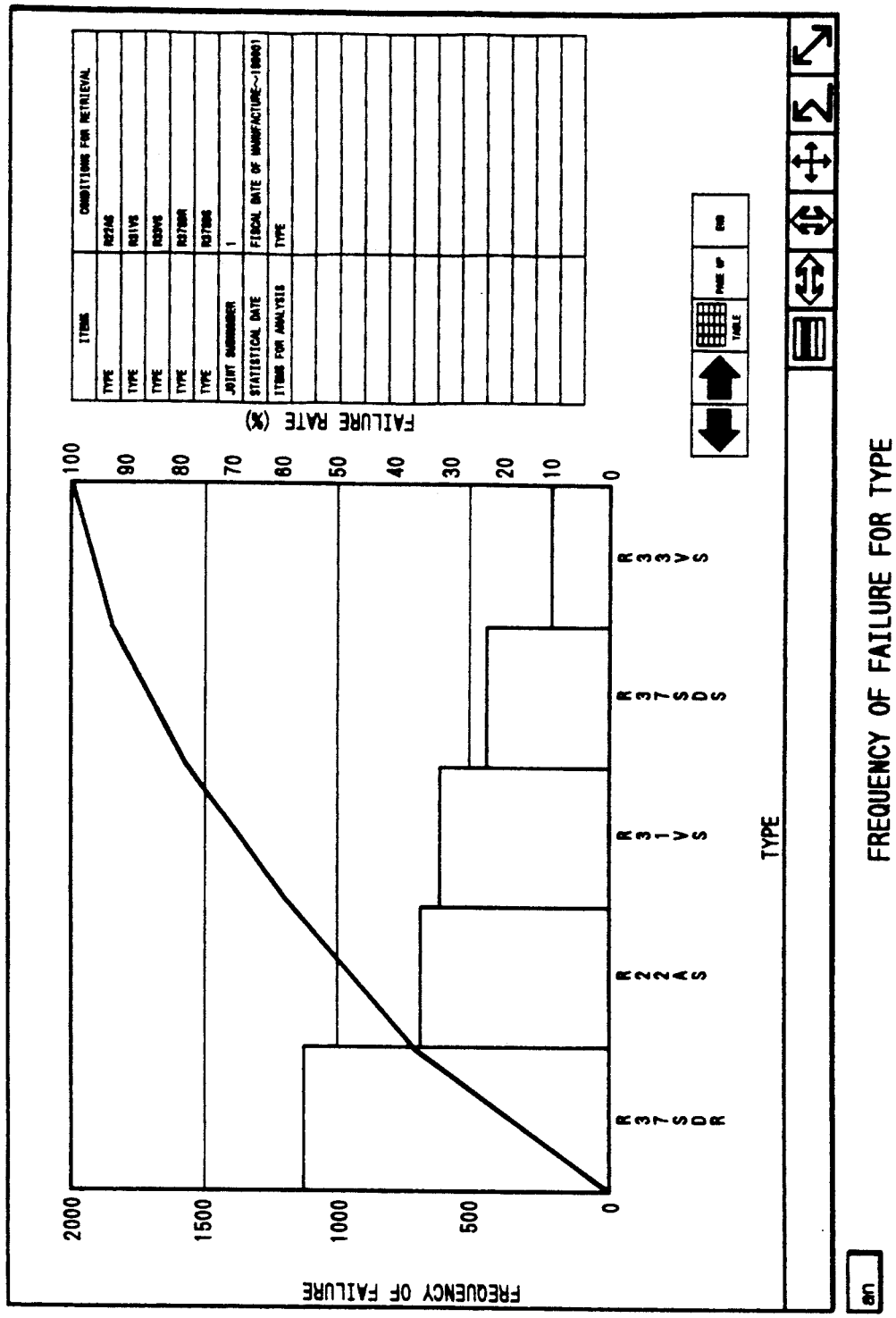

(iv) FIG. 8(d) shows an example of a constructive ratio diagram. The data representing the frequency of failure, the repair cost and the failure rate are classified into to categories, i.e., a primary category and a secondary category, the primary category is measured on the horizontal axis and the secondary category is measured on the vertical axis. The values of the data are tabulated.

(v) Circular Graph

FIG. 8(e) shows an example of a circular graph. The data representing the frequency of failure, the repair cost and the failure rate are classified by category and classified data are displayed. Data of a specified category can be classified further into further categories. The data are tabulated.

(vi) Scatter Diagram

Figure 8F:
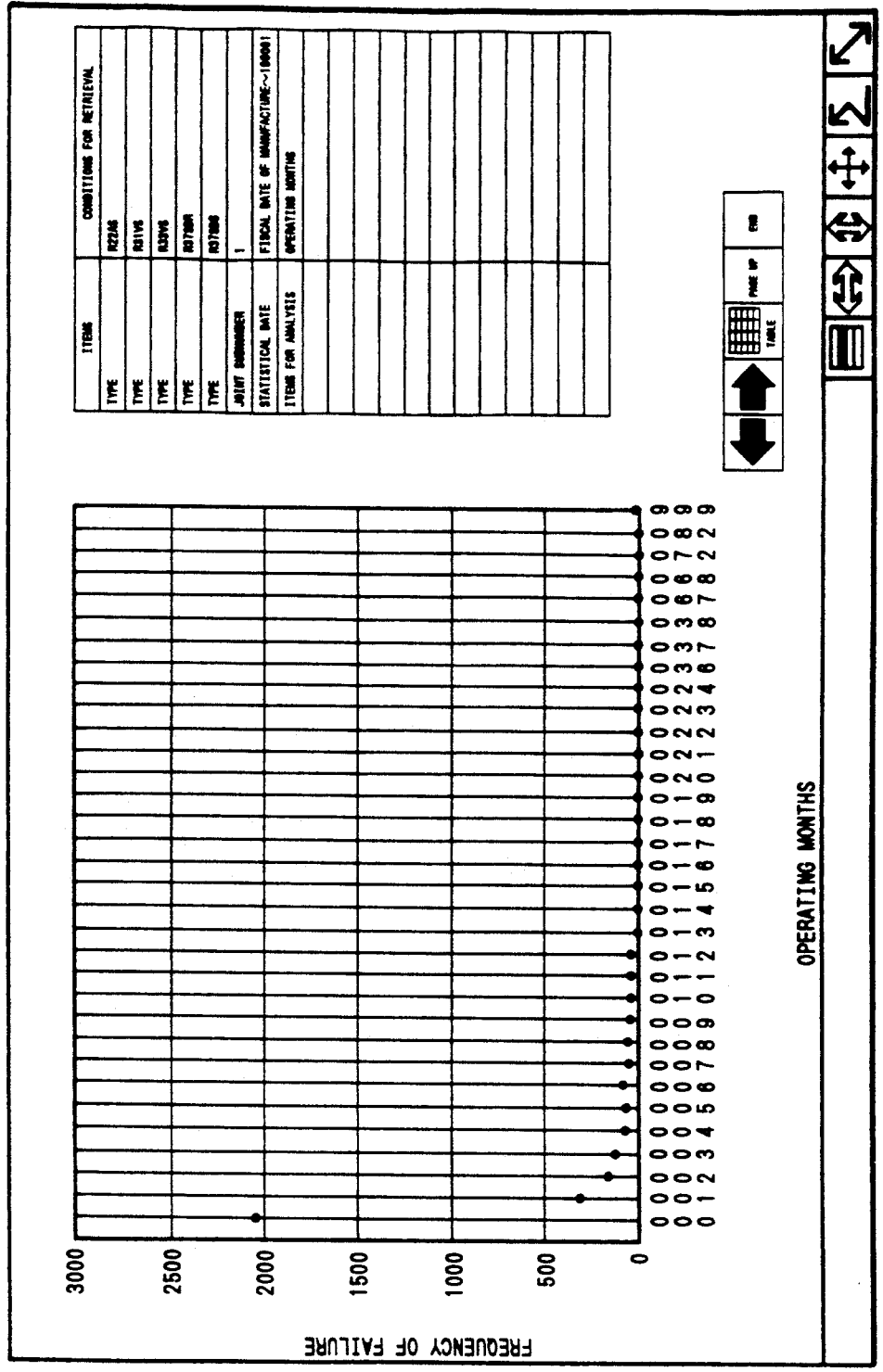

FIG. 8(f) shows an example of a scatter diagram, in which each plot represents a pair of data. The data are tabulated.

(vii) Specification

FIG. 8(g) shows an example of a specification. Data retrieved from service cards are classified, rearranged and sorted by item into three categories at a maximum to extract specified data. The data are displayed in a table.

Thus, by the parallel execution of a process of finding the causes of failure and a process of displaying the results of the operation, it is possible to further expand the functions for carrying out the numerical operation according to the specified analyzing method and for providing the results of the numerical operation in an output mode specified by the analyzing method and to enable an explanation of causes of the actual failure of the product and problems in the quality of the product. Details of the processes are shown, by way of example, in FIGS. 9(a) to 9(c).

Figure 9A:
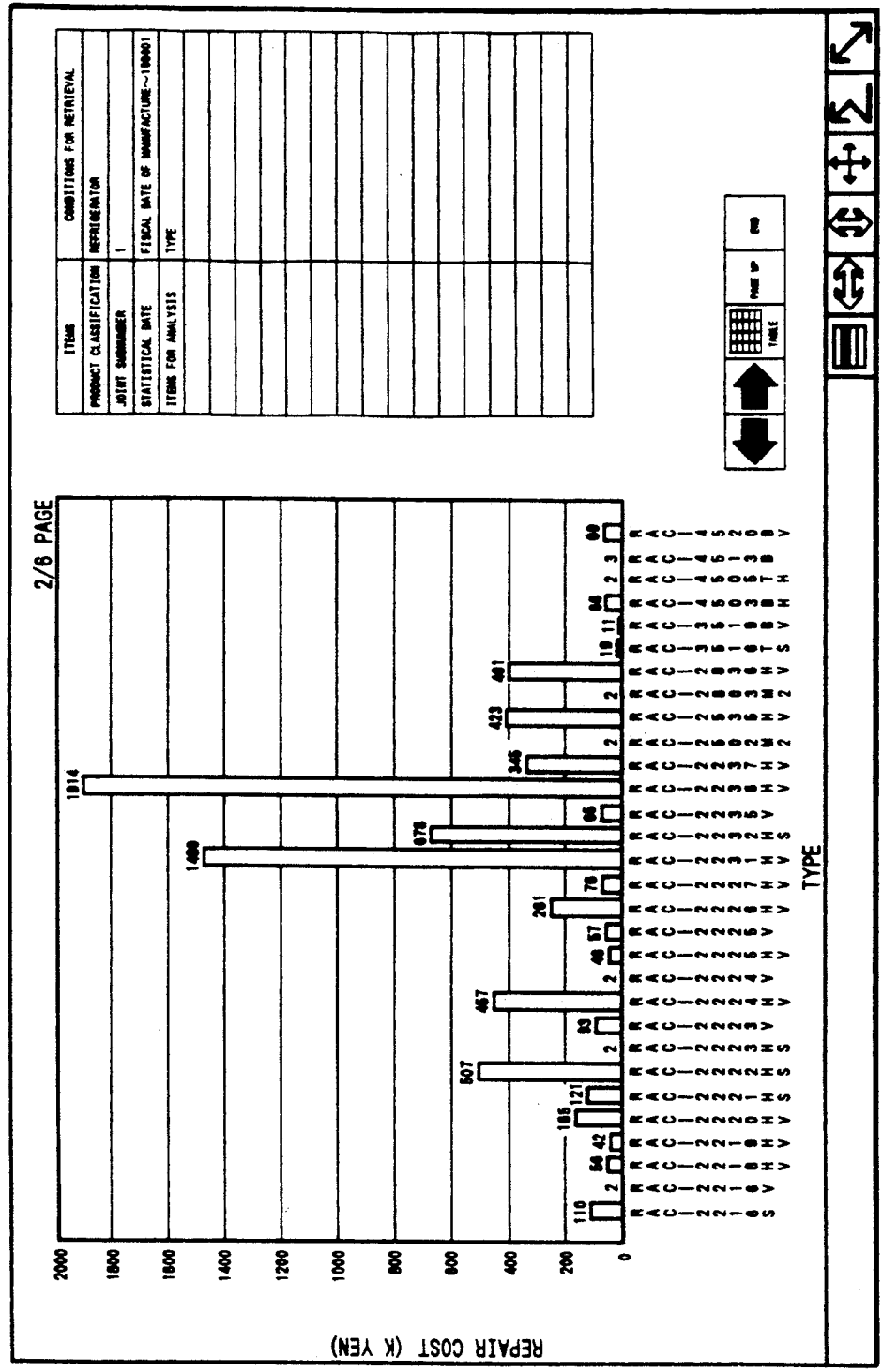
FIGS. 9(a) to 9(c) are views for explaining a procedure for locating causes of the failure of a product and problems in quality of the product according to the present invention on the basis of data acquired in the field.
Figure 9B:
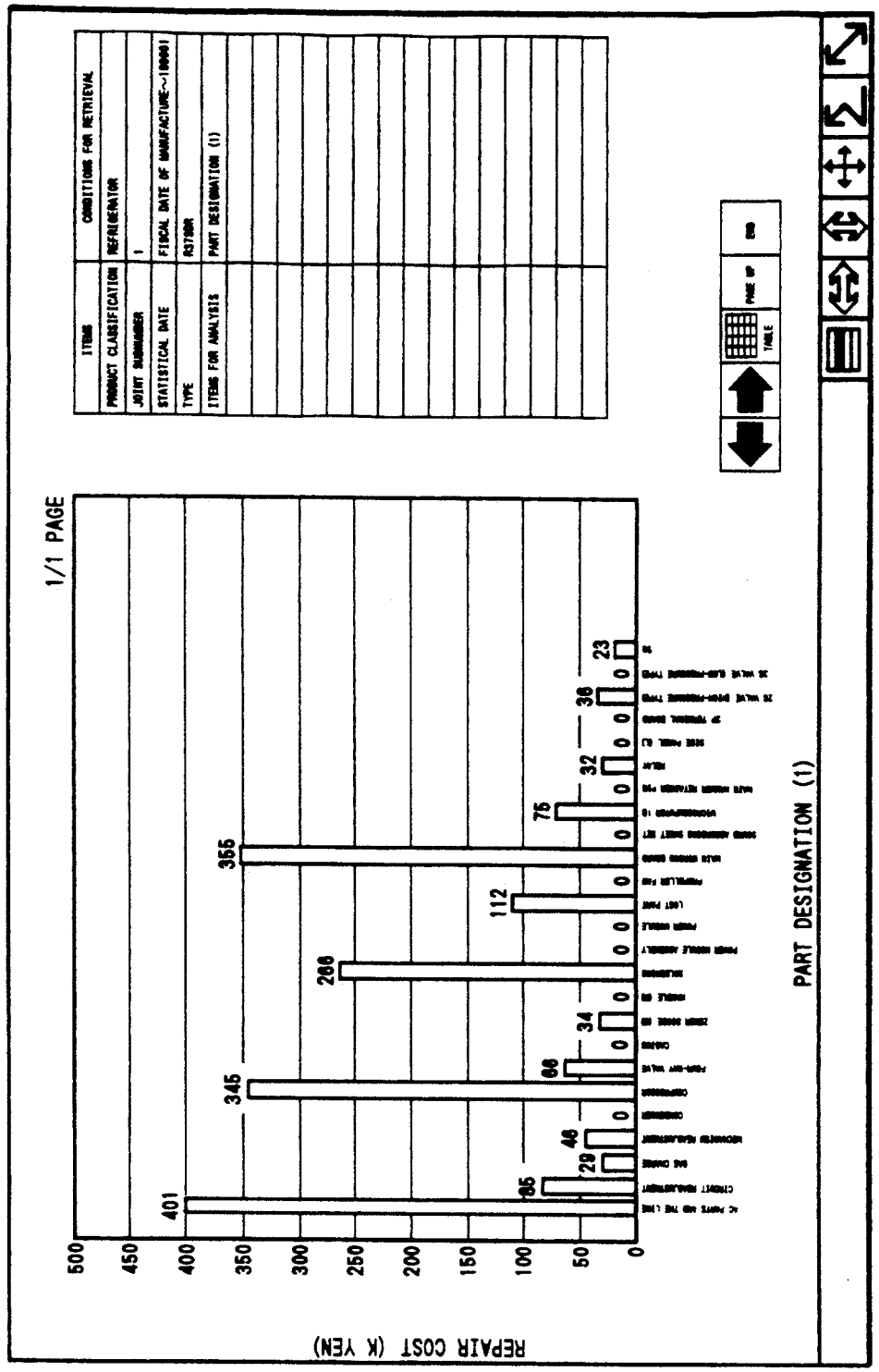
Figure 9C:
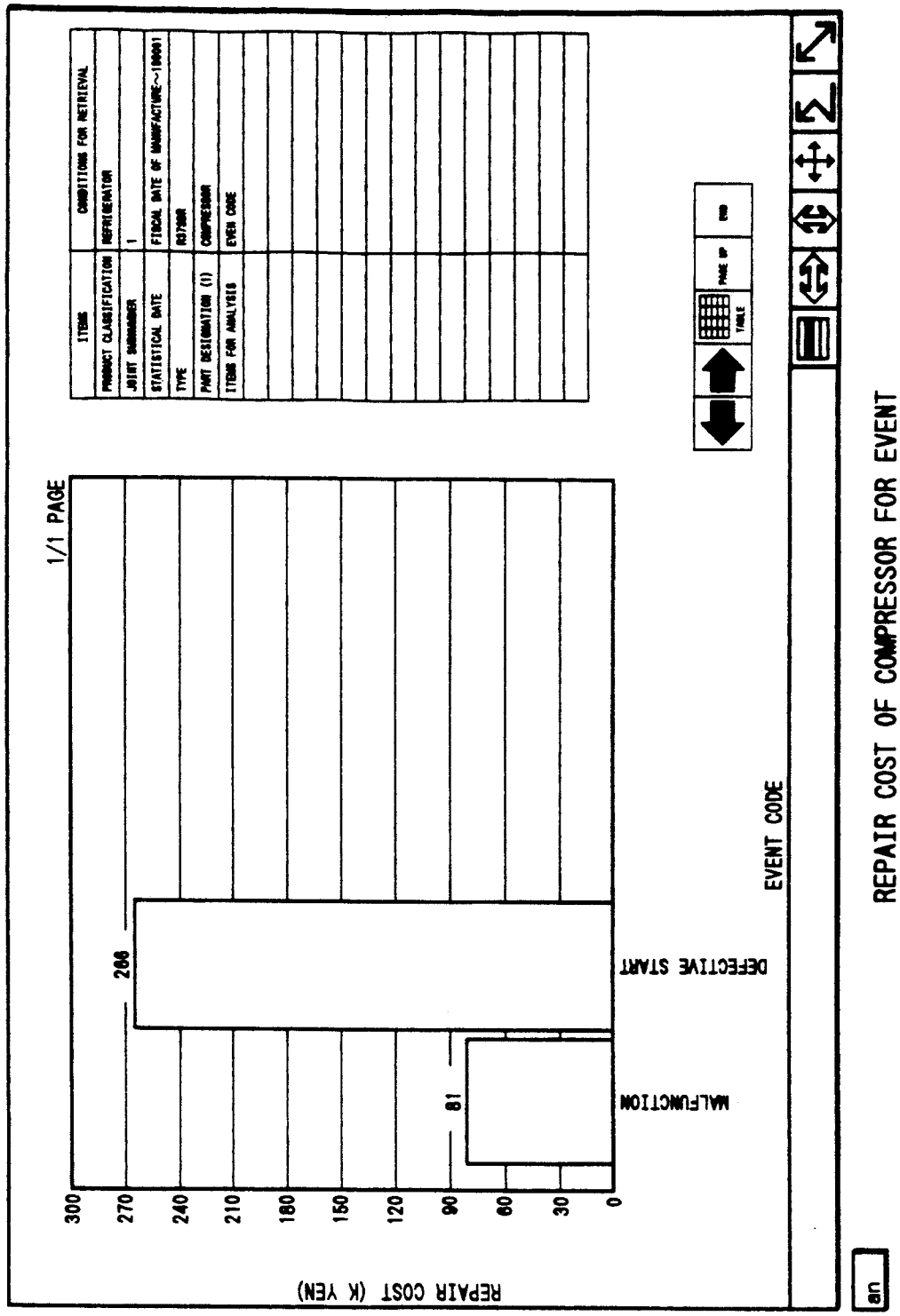

The integrated quality control method will be described as applied to the quality control of a series of air conditioners. Objective air conditioners for analysis for the improvement of the design and inspection system are chosen among a series of air conditioners by classifying the data representing the frequency of failure, the repair cost and the failure rate by the type of air conditioners. The results of classification are displayed as shown in FIG. 9(a). Assuming that an air conditioner of a type: RAC-2236HV, which is prominent in repair cost, is chosen as the object for analysis, the cursor of the computer display is placed under the bar indicating the repair cost for RAC-2236HV by means of a mouse and an instruction is given to select only the data of the air conditioner of RAC-2236HV. Components of the air conditioner of RAC-2236HV subject to design improvement and inspection system improvement are chosen with reference to diagrams showing the frequency of failure, the repair cost and the failure rate classified by part and by the condition of failure. FIG. 9(b) shows repair costs for the component parts of the air conditioner RAC-2236HV. From FIG. 9(b), the compressor, which is prominent in repair cost, is chosen. In choosing data of repair cost for compressors, which failed during operation, of the air conditioners of RAC-2326HV, the cursor is placed under a bar indicating the repair cost for compressors by means of the mouse and an instruction is entered. Components of compressors subject to design improvement and inspection system improvement are chosen by using a diagram of FIG. 9(c) showing the repair cost classified by the condition of failure. Thus, it is determined that the starting mechanism of the compressor is one of the most important objects of design improvement and inspection system improvement.

Figure 10A:
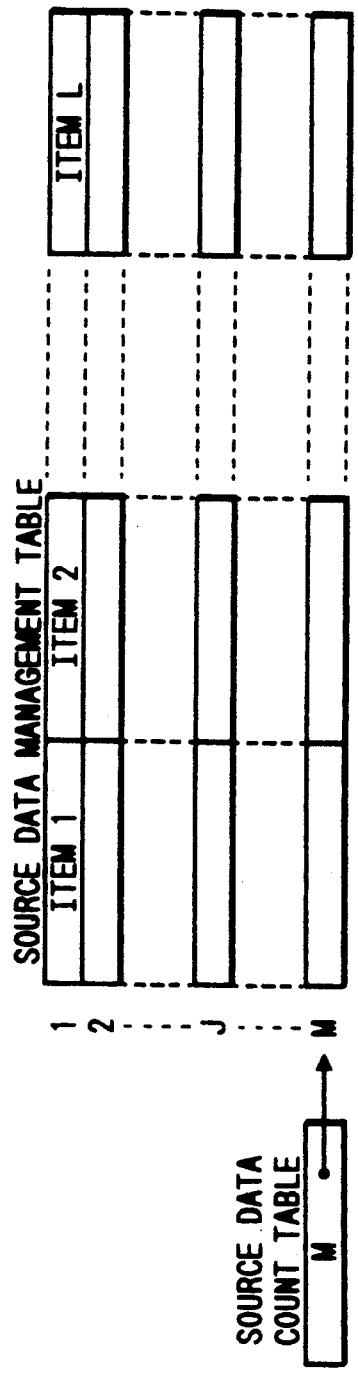
FIGS. 10(a) and 10(b) show a set of data related tables in accordance with the present invention.
Figure 10B:
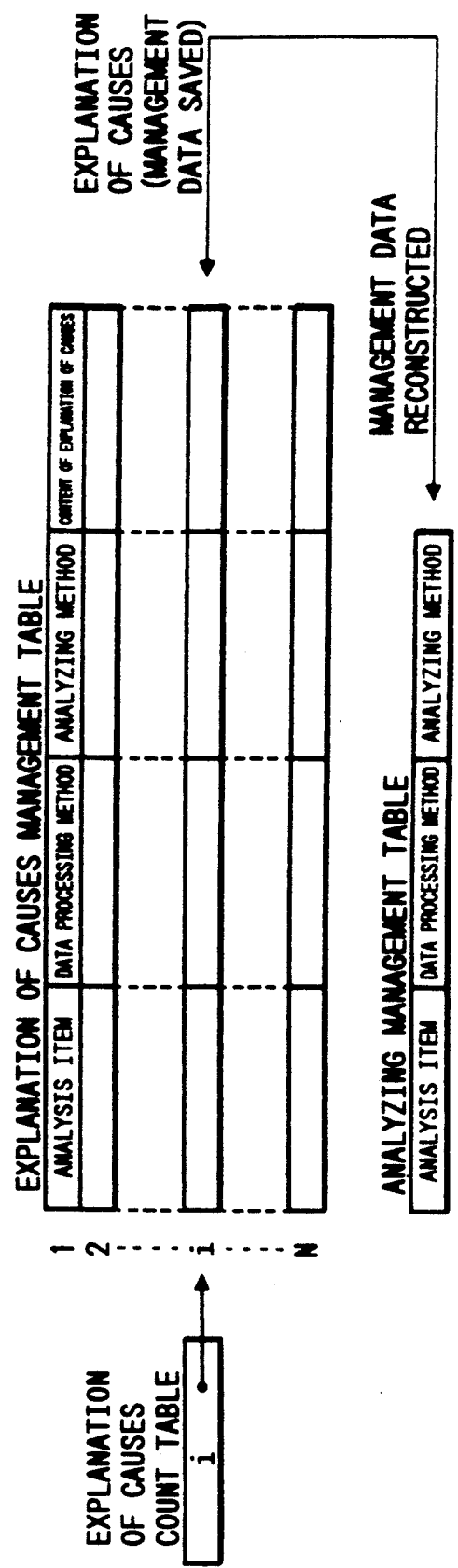

FIG. 10(a) and 10(b) show a set of data-related tables providing typical data for explanation of causes of actual failure of product. The explanation of causes involves analyzing and developing in more detail the contents of analyzed data regarding specific factors and as described below enables processing in the manner indicated in FIGS. 9(a)-9(c).

The source data management table shown in FIG. 10(a) is a table that manages source data for the explanation of causes wherein one line represents the repair of one failure. The data on the repair of one failure comprises a plurality of items, each item containing independent information. A specified data processing method is applied to each column of the items for data analysis. The source data count table in FIG. 10(a) stores the number of data lines held in the source data management table.

The analyzing management table in FIG. 10(b) is a table that manages the information for analyzing the source data. This table comprises an analysis item, a data processing method and an analyzing method. The analysis item contains an item number (1−L) of the source data to be analyzed. The data processing method stores the type of processing to be made on the specified analysis item. The analyzing method contains the type of display to be made of the analyzed result. The specified data processing method is executed on the analysis item contained in the analyzing management table. The result of the analysis is displayed in accordance with the specified analyzing method.

The explanation of causes management table in FIG. 10(b) accommodates an analyzing management table and the content of a data item, the table containing information necessary for the explanation of causes, the data item being specified by the analyzed data displayed according to the analyzing method, the data item being further accommodated as the content of explanation of causes. The explanation of causes count table in FIG. 10(b) stores the number of data items stored in the explanation of causes management table. When a plurality of data items are held in the explanation of causes table, a check is repeated as many times as the explanation of causes count to see if the content of explanation causes on the analysis items is the same. If all analysis items are found to be the same in content, the data items are judged to be subject to the explanation of causes; they are processed in accordance with the data processing method stored in the analyzing management table.

Figure 11:
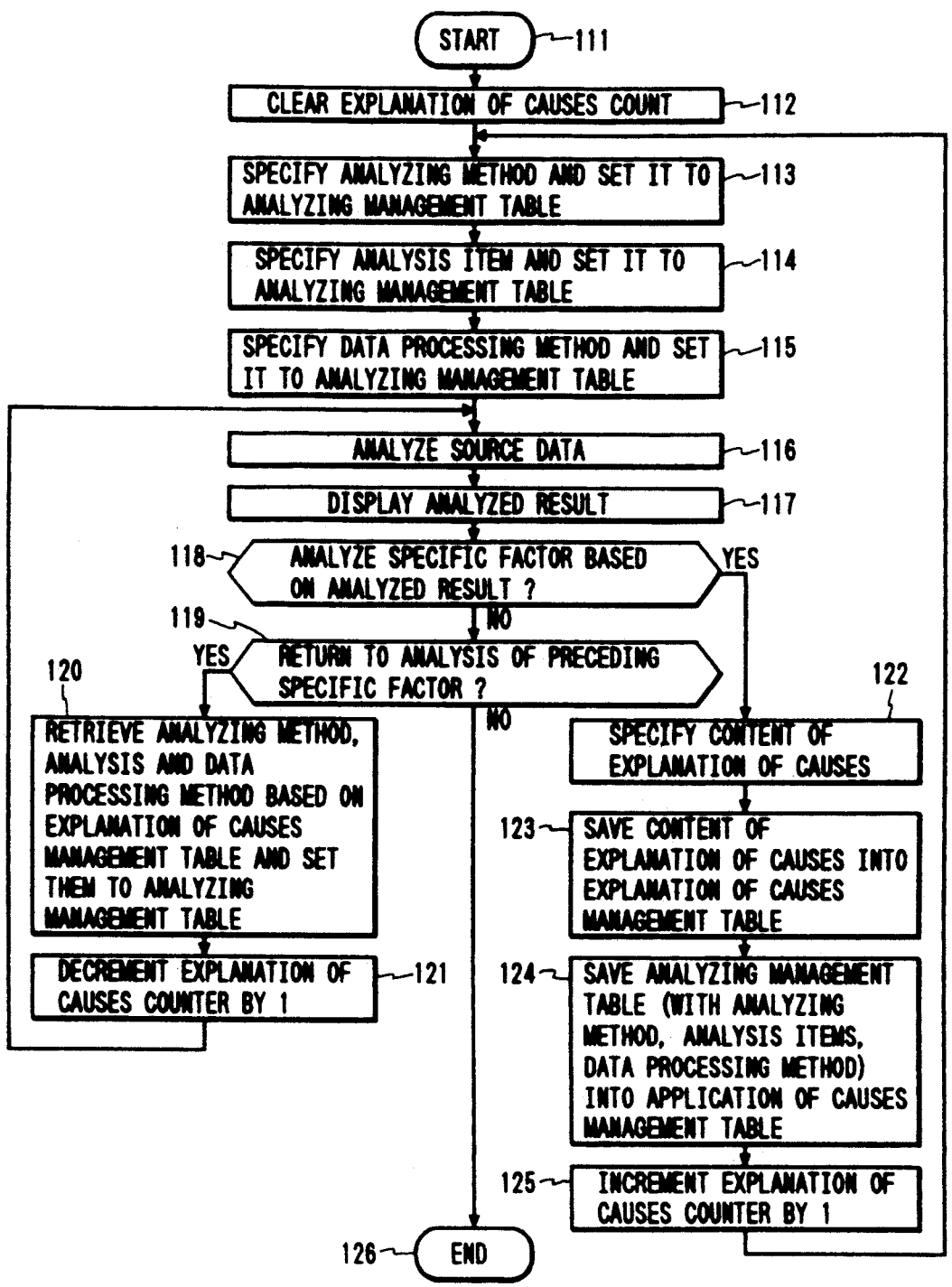
FIG. 11 is a flow chart for processing in accordance with the present invention.

FIG. 11 is a flow chart of the explanation of causes for a specific analysis item. It is assumed for the steps in the flow chart that all necessary data are set in the source data management table and in the source data count table shown in FIG. 10(a).

FIG. 11 shows a flow chart for processing starting with step 111. The explanation of causes count in the explanation of causes count table is first cleared in step 112. Next, the analyzing method, analysis item and data processing method, i.e., the information held in the analyzing management table, are specified and set thereto in steps 113 to 115. In step 116, source data is analyzed in accordance with the information set in the analyzing management table. The result of the analysis is displayed in step 117 according to the analyzing method contained in the analyzing management table. Based on the analyzed result, a check is made to see if the content thereof is analyzed and developed in more detail regarding the specific factor in question in step 118. If it is judged that the specific factor is to be further analyzed, i.e., Yes, steps 122 to 125 are carried out where one is specified out of the analysis items displayed by the analyzing method of the analyzing management table. The analyzed content of the specified factor is saved into the explanation of causes management table. The content of the analyzing management table indicative of the current content of analysis (analyzing method, analysis item, data processing method) is saved into the explanation of causes management table. Thereafter, an explanation of causes management counter is incremented by 1. This completes the saving of the current analysis-related information. Where a specific factor is to be analyzed, the information held in the analyzing management table is specified; where no specific factor is to be analyzed, i.e., No, a check is made to see if control is returned to the analysis of the preceding specific factor, which is the content of the preceding analysis as shown in step 119. If control is to be returned to the analysis of the preceding specific factor, i.e., Yes, the following takes place in accordance with steps 120 and 121: The analyzing method, analysis item and data processing method are retrieved from the explanation of causes management table and set into the analyzing means management table. The explanation of causes count table is then decremented by 1, and the analysis data is reconstructed. The source data is analyzed based on the information which was set from the explanation of causes management table to the analyzing management table, and the result of the analysis is displayed. If control is not returned to the analysis of the preceding specific factor, the whole processing comes to an end.

Figure 12:
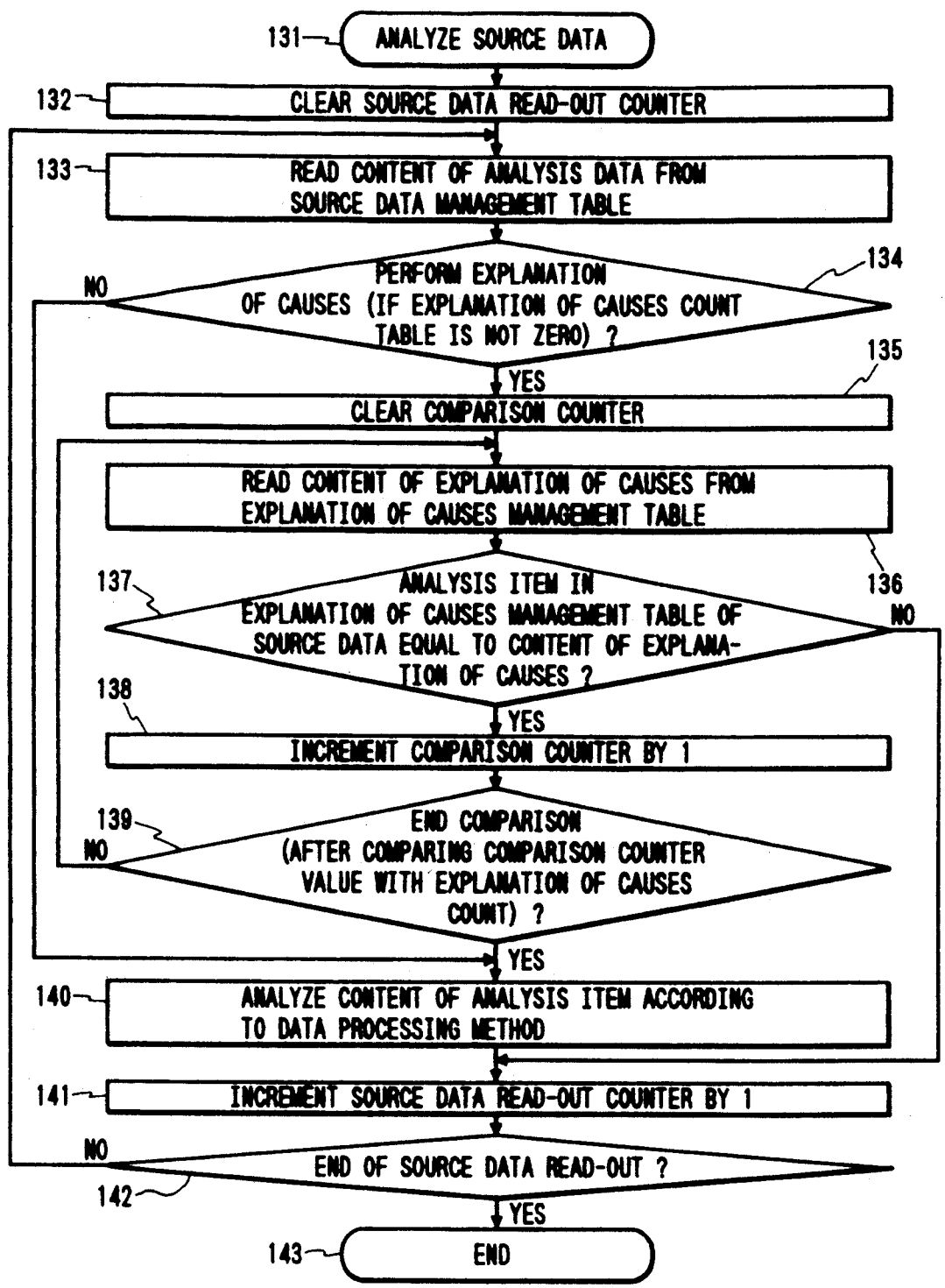
FIG. 12 is a flow chart for other processing in accordance with the present invention.

FIG. 12 is a flow chart of source data analysis. The steps of this flow chart are intended to execute the data processing method on the content of the source data management table in accordance with the information from the analyzing management table with analyzing source data in step 131.

A source data read-out counter is cleared first in step 132. Then the content of analysis items is read from the source data management table in step 133. Based on the value of the explanation of causes count table, a decision is made as to whether or not to perform an explanation of causes in step 134. If the explanation of causes is to be performed, i.e., Yes, a comparison counter is cleared in step 135. The content of the explanation of causes is read from the explanation of causes management table in step 136. A check is made to see if the content of the explanation of causes is the same as the analysis item stored in the explanation of causes management table of the source data in step 137. If the content and the item are the same, i.e., Yes, the explanation of causes comparison is incremented by 1 in step 138. When the value of the explanation of causes comparison counter becomes equal to the explanation of causes count, a check is made to see if the read position data equal to the value of the source data read-out counter is the analyzed data of the specific factor in step 139. Thereafter the analysis item in the analyzing management table is analyzed in accordance with the data processing method in step 140. If the source data item is not the same as the content of the explanation of causes, or if no explanation of causes is to be carried out, no data processing is performed. Then the source data read-out counter is incremented by 1 in step 141. Until the value of the source data count table becomes equal to the read-out count, the content of the analysis items in the source data management table is processed in accordance with the value of the source data read-out counter and then processing is ended.

A method of predicting possible failures from the presently available data of failures and the trend of shipping of the product will be described hereinafter with reference to FIG. 13 and the following algorithm of the failure occurrence prediction method by performing the following steps:

Step A: Find the total number of operating units N(t) and the number of failures r(t) for the number of months worked "t".

Step B: Find the failure rate using the equation $$\lambda(t) = r(t)/N(t)$$

Step C: Plot (t, ln Σλ(t)) on a hazard rate sheet.

Step D: Apply a straight or broken line to the plotted points and select those that are applicable.

Step E: Find the parameter (m,η) for the failure distribution (Weibull distribution) based on the gradient and intercept of the straight line.

Step F: Using the parameter obtained in step E and based on the equation $$f(t) = m\left(\frac{t}{\eta}\right)^{m-1} \exp\left(-\left(\frac{t}{\eta}\right)^m\right)$$

find the accumulated failure rate $F(t) = \int f(t)dt$ for the predicted month "t".

Step G: Find the accumulated number of failures for the predicted month based on Σn·F(t), (n: number of units sold per month).

Step H: Find the accumulated number of failures for the predicted month based on Σn/F(t)/N, (N=ΣN(t) (total number of units sold)).

As shown in the left side of FIG. 13, the type of the product, the condition of failure, parts pertinent to the failure, measures taken to repair the failed product are reported by using a card upon the occurrence of the failure of the product. In life test operation, products are started at the same time, whereas products installed for practical operation start operation at different times. Therefore, as shown in the upper left-hand corner of the right-hand column in FIG. 13, the respective failure rates of the products are calculated and classified by operating time represented by the number of operating months.

Cumulative hazard values are determined from the failure rates and are plotted as a function of the number of operating months. The possibility of failure is estimated on the basis of the gradient and intercept of a straight line approximating the plots. A Weibull distribution is employed as a model for the estimation of the possibility of failure. The possibility of failure is estimated by using a function f(t) shown in the lower left-hand corner of FIG. 13 employing the gradient m and the intercept m·lnη determined by linear approximation are used as Weibull parameters. Generally, when m<1, the Weibull distribution has a pattern indicating frequent initial failure, when m>1, the Weibull distribution has a pattern indicating frequent wear-out failure, and when m=1, the Weibull distribution has a pattern indicating frequent random failure.

The present invention enables a work station to achieve all the necessary operations for the retrieval and analysis of quality data and hence sequences for data retrieval, data analysis request, data processing and output processing are executed in a real-time mode, so that the turnaround time of the analyzing tasks can be effectively curtailed.

The present invention also enables the field serviceman assigned to the maintenance of the product installed in customer's working site to feed information concerning repair work performed by the field serviceman mostly on the site without delay through the station of the business department, such as the office of a special agent or a business office, to the factory, which is the principal department responsible for the design, manufacture and inspection of the product, in case the failure of the product occurs. Thus, the improvement of the design of the product under production and the inspection system for evaluating and inspecting the component parts of the product can be achieved without delay, and the information concerning the failure of the product is used effectively for designing a new product having an improved reliability.

All the necessary operations for the retrieval and analysis of the quality data can be achieved at the work station and hence sequences for data retrieval, data analysis request, data processing and output processing can be carried out in a real-time mode, so that the turnaround time of analyzing tasks can be curtailed.

Furthermore, the retrieval of records of source data and the development of the records on a memory at the work station enables the analysis of each item of data concerning the failure and repair of the product and combinations of the items of the data.

While we have shown and described specific examples in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. An integrated quality control method for determining failure causes of a product comprising the steps of:
    collecting information relating to failure of the product and measures taken to correct the failure;
    collecting information relating to manufacture and distribution of the product;
    combining the information relating to the failure and measures taken to correct the failure with the information relating to the manufacture and distribution of the product; and
    analyzing the combined information for enabling a determination of causes of the failure of the product and a prediction of possible failures.

2. A method according to claim 1, wherein the step of analyzing the information for predicting possible failures includes the steps of:
    fining the total number of operating units N(t) of the product and the number of failures r(t) for the number of months worked t;
    determining a failure rate using the equation $\lambda(t) = r(t)/N(t)$;
    plotting t, ln $\lambda(t)$ on a hazard rate sheet and applying a line to the plotted points while selecting applicable points;
    determining the parameter $(m, \eta)$ for a Weibull failure distribution based on the gradient of the line;
    using the determined parameter $(m, \eta)$ and in accordance with the equation $$f(t) = m \left( \frac{t}{\eta} \right)^{m-1} \exp\left( - \left( \frac{t}{\eta} \right)^m \right)$$

determining the accumulated failure rate $(F(t) = \int f(t)dt$ for a predicted month;
    determining the accumulated number of failures for the predicted month based on $\Sigma n \cdot F(t)$ where n is the number of units of the product sold per month; and
    determining the accumulated rate of failures for the predicted month based upon $\Sigma n \cdot F(t)/N$ where $N = \Sigma N(t)$ is the total number of the units of the product sold.

3. A method according to claim 1, wherein the step of collecting information relating to the manufacture and distribution of the product includes collecting information relating to the date of shipping, sales conditions, date of manufacture, type of the product and conditions of manufacture thereof.

4. A method according to claim 3, wherein the step of collecting information relating to the manufacture and distribution of the product further includes collecting information relating to environmental conditions in the manufacture and distribution.

5. A method according to claim 4, wherein the environmental conditions include at least one of temperature and humidity at the time of manufacture of the product.

6. A method according to claim 1, wherein the steps of collecting information relating to failure of the product and measures taken, collecting information relating to manufacture and distribution, combining and analyzing information are effected for a plurality of products.

7. A method according t claim 6, wherein the step of analyzing includes storing the combined information in a data base, accessing and searching the data base and displaying graphical information for the plurality of products, selecting one of the plurality of products for display of information specifically related thereto, and displaying the specifically related information of the selected product without reaccessing the data base.

8. A method according to claim 7, wherein the step of analyzing is carried out utilizing an individual work station.

9. A method according to claim 1, wherein the step of analyzing the combined information includes correlating the collected information relating to failure of the product and measures taken to correct the failure with the collected information relating to manufacture and distribution of the product.

10. A method according to claim 9, wherein the step of analyzing includes displaying the correlated information in a continuous manner in dependence upon limited predetermined parameters of the product and expanding the display based upon the predetermined parameters.

11. A method according to claim 10, wherein the displaying of information includes displaying the correlated information in different graphical forms, applying predetermined parameters to one of the graphical forms, and displaying the correlated information in a different graphical form representing an expansion of the display based upon the predetermined parameters.

12. A method according to claim 11, wherein the step of analyzing the information includes utilizing an individual work station and displaying the information on a display thereof.

13. An integrated quality control system for determining failure causes of a product comprising:
 means for inputting information relating to failure of the product and measures taken to correct the failure and information relating to manufacture and distribution of the product;
 means for storing and for combining the information relating to the failure and measures taken to correct the failure with the information relating to the manufacture and distribution of the product; and
 means including an individual work station for enabling analyzing of the combined information, for enabling display of an investigation of causes of the failure of the product and for enabling a prediction of possible failures.

14. A system according to claim 13, wherein the means for storing information stores information relating to a plurality of products in a data base, the means for analyzing and for enabling display includes means for accessing and searching the data base and for displaying graphical information for the plurality of products, means for selecting one of the plurality of products for display of information specifically related thereto, and means for displaying the specifically related information of the selected product without reaccessing the data base.

* * * * *